J. ANDES.
SNAP HOOK.
APPLICATION FILED FEB. 27, 1918.

1,276,474.

Patented Aug. 20, 1918.

Inventor
Joseph Andes
By Watson E. Coleman
Attorney

UNITED STATES PATENT OFFICE.

JOSEPH ANDES, OF HAZLETON, PENNSYLVANIA.

SNAP-HOOK.

1,276,474.

Specification of Letters Patent.   Patented Aug. 20, 1918.

Application filed February 27, 1918.   Serial No. 219,469.

*To all whom it may concern:*

Be it known that I, JOSEPH ANDES, a citizen of the United States, residing at Hazleton, in the county of Luzerne and State of Pennsylvania, have invented certain new and useful Improvements in Snap-Hooks, of which the following is a specification, reference being had to the accompanying drawings.

This invention relates to certain improvements in snap hooks and has relation more particularly to a device of this general character of a double type and it is an object of the invention to provide a device of this general character which may be readily and conveniently employed for connecting the meeting ends of chains or the like and wherein a retaining spring coacts with each of the hooks in such a manner as to prevent the spring from catching when pull is imposed upon the hook.

The invention consists in the details of construction and in the combination and arrangement of the several parts of my improved snap hook whereby certain important advantages are attained and the device rendered simpler, less expensive and otherwise more convenient and advantageous for use, as will be hereinafter more fully set forth.

The novel features of my invention will hereinafter be definitely claimed.

Figure 1:
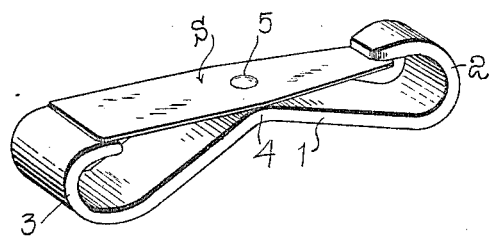
Figure 2:
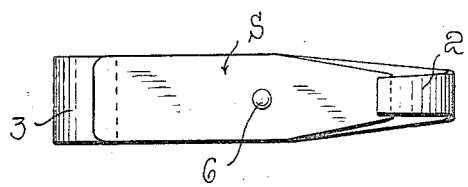

In order that my invention may be the better understood, I will now proceed to describe the same with reference to the accompanying drawings, wherein:

Figure 1 is a view in perspective of a snap hook constructed in accordance with an embodiment of my invention; and Fig. 2 is a view in top plan of the hook as disclosed in Fig. 1.

As disclosed in the accompanying drawings 1 denotes the shank or body of my improved hook which is longitudinally curved or bowed and said body or shank is provided at opposite ends with the inwardly facing hooks 2 and 3. The inner surface of the free end of the hook 2 is substantially flush with the central or high point 4 of the shank or body 1 while the outer surface of the free end of the hook 3 is substantially flush with said central or high point 4. S denotes a straight flat spring one end of which underlies the free end portion of the hook 2 while the opposite end of said spring S overlies the free end portion of the hook 3. Said spring also contacts with the central or high point 4 of the shank or body 1 and is secured thereto by a rivet 5 or other suitable means. The essential feature of my present invention is the particular manner whereby the spring S coacts with the hooks 2 and 3.

The uses to which my improved hook may be put are many, but it is particularly adapted for use in connection with hoisting chains, drag lines or the like for connecting separated ends thereof. When employed the hook is so applied as to assure the pull upon the hook being at the end provided with the hook 2 so that should the spring S come in contact with any obstruction, the same will readily pass thereby. By this means the possibility of the ends of the hook becoming caught in any object is entirely eliminated. For instance, should my improved hook be employed in connection with a drag line, the hook will not catch fast to a nail or the like, nor will it catch the limb or clothing of a person which is also true should my improved hook be employed in connection with a hoisting chain. While I have mentioned these two particular uses I wish it to be understood that I do not limit my improved hook to these specific adaptations.

From the foregoing description, it is thought to be obvious that a snap hook constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A snap hook comprising a shank having its end portions provided with inwardly facing hooks, and a spring secured intermediate its length to the shank and having one end portion underlying one of the hooks and its opposite end portion overlying the second hook.

2. A snap hook comprising an elongated shank longitudinally bowed and having its end portions provided with inwardly facing hooks, a flat spring secured to the eye point of the shank and having one end portion underlying one of the hooks and its opposite end portion overlying the second hook.

3. A snap hook comprising an elongated shank longitudinally bowed and having its end portions provided with inwardly facing hooks, the inner surface of the free end of one of the hooks being substantially flush with the central portion of the shank, and the outer surface of the free end of the second hook being substantially flush with the central portion of the shank, and a flat spring secured to the central portion of the shank and having one end portion underlying the first named hook and its opposite end portion overlying the second hook.

In testimony whereof I hereunto affix my signature in the presence of two witnesses.

JOSEPH ANDES.

Witnesses:
NEIL M. CUSATIO,
JACK BROGAN.

Copies of this patent may be obtained for five cents each, by addressing the "Commissioner of Patents, Washington, D. C."